Dec. 21, 1965  KATSUMI TAKAMI ETAL  3,225,211
D.C-.A.C. CONVERSION METHOD AND APPARATUS
Filed Jan. 3, 1964  2 Sheets-Sheet 2
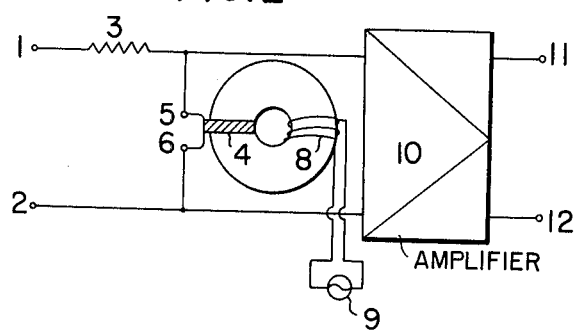
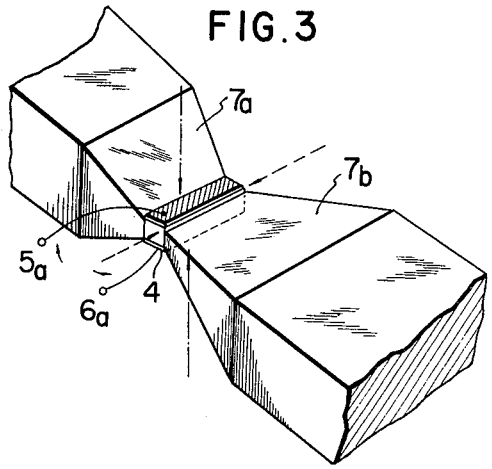
INVENTORS
Katsumi Takami
Zenmon Abe
Kiyokata Matsuura
Yoshio Furuhata
BY
Western & Western United States Patent Office 3,225,211
Patented Dec. 21, 1965

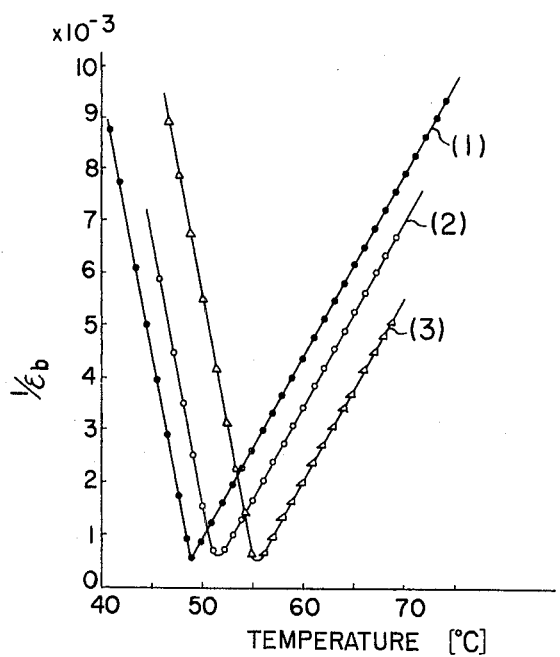
FIG. I

3,225,211
D.C.-A.C. CONVERSION METHOD AND
APPARATUS
Katsumi Takami and Zenmon Abe, Kitatama-gun,
Tokyo-to, Kiyokata Matsuura, Chikusa-ku, Nagoya-shi,
and Yoshio Furuhata, Hachioji-shi, Japan, assignors to
Kabushiki Kaisha Hitachi Seisakusho, Tokyo-to, Japan,
a joint-stock company of Japan
Filed Jan. 3, 1964, Ser. No. 335,613
Claims priority, application Japan, Jan. 11, 1963,
38/458
5 Claims. (Cl. 307—88)

This invention relates to conversion of direct current to alternating current, and more particularly it relates to new D.C.-A.C. conversion method and apparatus.

Among apparatuses heretofore proposed as D.C.-A.C. converters there are mechanical choppers, transistor choppers, photoelectric choppers, Hall-element type converters, magnetic modulators, resistance modulators (cryotrons), vibrating reed type converters, and variable capacitance diode type converters.

The present invention resides in new D.C.-A.C. conversion method and apparatus which are based on a conversion principle which is completely different from those of the above-listed converters, and in which mechanical pressure is applied to the dielectric material of a ferroelectric capacitor to cause the Curie point thereof to shift, and the corresponding abrupt variation in dielectric constant is utilized as a variation in static capacity.

The nature, principles, objects, and details of the invention will be best understood by reference to the following description taken in conjunction with the accompanying drawing in which like parts are designated by like reference characters, and in which:

FIGURE 1 is a graphical representation with characteristic curves indicating relationships between dielectric constants of ferroelectric materials and temperature with pressure taken as a parameter;

FIGURE 2 is a connection diagram indicating a preferred embodiment of the invention; and FIGURE 3 is a fragmentary perspective view, diagramatically indicating the construction of the essential parts of another embodiment of the invention.

As is well known, ferroelectric substances consisting of barium titanate, triglycine sulfate, lead zirconate, and solid solutions of these substances and other ferroelectric materials exhibit maximum dielectric constants at their respective Curie points and, at higher temperatures exhibit decreasing dielectric constants in inverse proportion to the temperature according to the so-called Curie-Weiss' law, which may be expressed as follows:

$$\epsilon_b = \frac{Kc}{T-Tc}$$

where: $\epsilon_b$ is the dielectric constant; $Kc$ is the Curie temperature.

On the other hand, in the temperature range from a temperature below the Curie point to the Curie point, the variation of dielectric constant with temperature is large. For example, in the case of triglycine sulfate, a 10-deg. C. temperature variation results in a variation in the dielectric constant of approximately 100 times.

On one hand, the Curie temperature $Tc$ of a ferroelectric material varies according to the following equation with the pressure applied on the ferroelectric material.

$$Tc = KP + Tco$$

where: K is a constant; P is the applied pressure (in atmospheres); and $Tco$ is a constant.

The value of the constant K is of the order of, for example, $2.6 \times 10^{-3}$ deg./atm. in the case of triglycine sulfate and $3.8 \times 10^{-3}$ deg./atm. in the case of triglycine selenate. The characteristic curves of this variation with triglycine sulfate taken as an example are shown in FIGURE 1 (according to Jona and Shirane: Phys. Rev., 117 (1) (1969)), in which curves (1), (2), and (3) respectively are for the cases of $P=1$ atm., $P=1,020$ atm., and $P=2,550$ atm. As is apparent from this graph, if a capacitor made of triglycine sulfate is maintained at a constant temperature, and a pressure of approximately 400 atmospheres is applied thereon, its Curie temperature will rise approximately 1 degree C. If, for the ferroelectric material, a substance whose dielectric constant varies approximately 100 times for every 10 degrees C. of tempreature variation as aforementioned, or approximately 10 times per degree C., is selected, it is possible for a pressure variation of several hundreds of atmospheres to cause an immediate variation of dielectric constant of one numerical digit or more.

Therefore, when a D.C. input signal or an ultra-low-frequency input signal is applied between the electrodes of a ferroelectric capacitor, and, at the same time, the capacitor is subjected to pressure variation, the said input signal is converted in accordance with the capacitance variation of the capacitor into an alternating current having a period which is equal to the period of the pressure variation. It has been found that the conversion efficiency in such a case is from several times to ten times higher than those of conventional converters, and that it is also possible to obtain an input impedance, as that of a converter element, of several megohms or higher.

However, if a conversion efficiency of the same order as those of conventional converters is sufficient, a pressure of several atmospheres will be sufficient, and the converter element in this case has the features of high D.C. input resistance and very low output impedance. Accordingly, the converter element affords an extremely effective modulation method for circuits such as all-transistorized amplifiers.

On the other hand, however, difficulties are encountered in practice in the application of pressures of from several hundreds of atmospheres to several thousands of atmospheres on a ferroelectric capacitor in order to increase its conversion efficiency.

The present invention, in another aspect thereof, contemplates overcoming these difficulties through the utilization of ultrasonic vibration.

In general, an ultrasonic vibrator (for example: a magnetostrictive vibrator or an electrostrictive vibrator) is characterized in that, while its displacement amplitude is small, a very high stress can be obtained thereby. For example, with an ultrasonic vibration of $A \sin \omega t$ (where A is amplitude), since the magnitude of acceleration becomes $A\omega^2$, the acceleration becomes 400 m./sec.² when the amplitude is of the order of 10 microns with a frequency of 1 kc./sec. This acceleration value corresponds to approximately 40 G (where G is the acceleration of gravity). With a frequency of 10 kc./sec. and an amplitude of 10 microns, an extremely high acceleration of 4,000 G is obtained.

The apparatus of the present invention in which this ultrasonic vibration is utilized to apply pressure will now be described with respect to a preferred embodiment of the invention as shown in FIGURE 2. An input in the form of a direct current or an ultra-low-frequency input signal is supplied to the apparatus through D.C. input terminals 1 and 2, through a high resistance 3, and to electrode terminals 5 and 6 of a ferroelectric capacitor 4. The capacitor 4 has, on opposite sides thereof, electrodes which are clamped by a toroidal-shaped magnestostrictive vibrator 7, whereby pressure is applied on the capacitor in the direction parallel to the electrodes. The vibrator 7 is provided with an exciting coil 8 supplied with a power from an exciting source 9. The afore-mentioned input is accordingly converted into alternating current by the variation of capacitance between the electrode terminals 5 and 6, and the signal so converted is amplified by an amplifier 10 to produce an output signal at its output terminals 11 and 12, whereby the objective operation is attained.

By the utilization of an ultrasonic vibration in the above-described manner, a high pressure can be readily obtained with only very small displacement of the electrodes, whereby an optimum means to apply pressure on the dielectric material is realized.

While in the example of the invention shown in FIGURE 2, the vibrator and capacitor assembly is so arranged that the pressure is applied in the direction parallel to the electrodes, the direction of pressure application may, of course, be caused to be perpendicular to the electrodes to attain the same objective operation. One example of construction for causing such perpendicular pressure application is shown in FIGURE 3. In this example, a ferroelectric capacitor 4 is provided with electrode terminals 5a and 6a, and poles 7a and 7b of a magnetostrictive vibrator or an electrostrictive vibrator are disposed to clamp the capacitor assembly so as to impart thereto a pressure in a direction perpendicular to the electrodes. A conversion circuit similar to that shown in FIGURE 2 is suitable for use also in the example illustrated in FIGURE 3.

On one hand, it is known that the dielectric constant of a ferroelectric material can be caused to vary widely not only by pressure application in one direction as described above but also by two-dimensional pressure application. That is, the Curie temperature $Tc$ in such a case varies in proportion to the square of the pressure P as indicated by the following equation:

$$Tc = K'P^2 + Tco'$$

where $K'$ and $Tco'$ are constants. In this case, therefore, even if, for example, $K'$ is of a value which is substantially smaller than the value of K, it is possible to cause ample shifting of the Curie temperature.

Two-dimensional pressure application may be obtained by disposing a magnetostrictive vibrator so as to apply pressure also in the direction of the intermittent dash line arrows or of the dot-and-dash chain arrows as shown in FIGURE 3, and synchronizing the exciting currents of the two vibrators.

In some cases when a ferroelectric material is subjected to a pressure, a piezoelectric voltage is generated, which voltage, moreover, is generated proportionally to the applied pressure, independently of the input signal. In such a case, by maintaining the temperature of the ferroelectric material at a point above the Curie point and then applying the pressure, the material is caused to become a paraelectric material, and, therefore, no piezoelectric voltage is generated.

Furthermore, by selecting a ferroelectric material of high tensile strength for the capacitor, its dielectric constant can be caused to vary by the application of tension or moment force instead of compression. A similar effective result can be obtained also by the application of a shear stress.

The ferroelectric material need not be limited to only single crystals, a ceramic capacitor the Curie point of which can be freely selected also being suitable for use according to the invention.

Furthermore, by applying pressure variation to a capacitor having a high polymer as its dielectric material and setting the surrounding temperature at a point selected from the $\alpha$ dispersion point, the $\beta$ dispersion point, and the $\gamma$ dispersion point, the capacitance of the capacitor can be caused to vary widely by the applied pressure.

It should be understood, of course, that the foregoing disclosure relates to only preferred embodiments of the invention and that it is intended to cover all changes and modifications of the examples of the invention herein chosen for the purposes of the disclosure, which do not constitute departures from the spirit and scope of the invention as set forth in the appended claims.

What is claimed is:

1. A method of converting direct current into alternating current which comprises applying a direct current input to a ferroelectric capacitor, imparting, at the same time, a mechanical stress to the dielectric material of the said capacitor, and thereby causing the capacitance of the said capacitor to vary at stress values in the vicinity of stress values at which the rate of capacitance variation with stress is high.

2. A method of converting direct current into alternating current which comprises applying an ultra-low-frequency input signal to a ferroelectric capacitor, imparting, at the same time, a mechanical stress to the dielectric material of the said capacitor, and thereby causing the capacitance of the said capacitor to vary at stress values in the vicinity of stress values at which the rate of capacitance variation with stress is high.

3. A D.C.-A.C. conversion apparatus comprising a ferroelectric capacitor, means to apply a direct current input to the said capacitor, and means to impart utlrasonic vibration to the dielectric material of the said capacitor.

4. A D.C.-A.C. conversion apparatus comprising a ferroelectric capacitor, means to apply an ultra-low-frequency input signal to the said capacitor, and means to impart ultrasonic vibration to the dielectric material of the said capacitor.

5. A method according to claim 1 wherein the ferroelectric capacitor is operated at a temperature above the Curie point at which piezoelectricity is not generated.

No references cited.

IRVING L. SRAGOW, *Primary Examiner.*